United States Patent [19]

Kondo

[11] Patent Number: 4,696,559
[45] Date of Patent: Sep. 29, 1987

[54] VARIABLE FOCAL LENGTH, AUTOMATIC FOCUSING CAMERA WITH A SINGLE MOTOR

[75] Inventor: Shigeru Kondo, Tokyo, Japan

[73] Assignee: Asahi Kogaku Kogyo Kabushiki Kaisha, Tokyo, Japan

[21] Appl. No.: 800,259

[22] Filed: Nov. 21, 1985

[30] Foreign Application Priority Data

Nov. 27, 1984 [JP] Japan .................. 59-251321

[51] Int. Cl.⁴ ..................... G03B 3/08; G03B 9/08
[52] U.S. Cl. .................... 354/403; 354/195.1; 354/195.12; 354/234.1
[58] Field of Search ............ 354/400, 402–405, 354/195.1, 195.12, 234.1, 235.1, 286

[56] References Cited

U.S. PATENT DOCUMENTS

| | | | |
|---|---|---|---|
| 4,294,527 | 10/1981 | Hashimoto et al. | 354/403 |
| 4,505,567 | 3/1985 | Hirohata et al. | 354/403 |
| 4,519,691 | 5/1985 | Yamada et al. | 354/400 |
| 4,525,050 | 6/1985 | Ohashi | 354/195.12 |
| 4,566,773 | 1/1986 | Kaneda | 354/403 |

*Primary Examiner*—W. B. Perkey
*Attorney, Agent, or Firm*—Sughrue, Mion, Zinn, Macpeak, and Seas

[57] ABSTRACT

A lens barrel unit for attachment to a camera body and providing automatic focusing variable focal length and shutters. A single motor provide motive power for the shutter, for the movement of part of the lens system for focusing and for mechanical scanning of a light emitting diode associated with the focusing. The drive train is accomplished by a cylindrical gear driven by the motor controlling the shutter through a cam face and controlling the focusing by the engagement of a pin with an end of its circumferential slot. The pin drives the lens along the axis simultaneously with the diode scanning until an electromagnetic prevents further movement upon detection of forms.

5 Claims, 2 Drawing Figures

U.S. Patent   Sep. 29, 1987   4,696,559
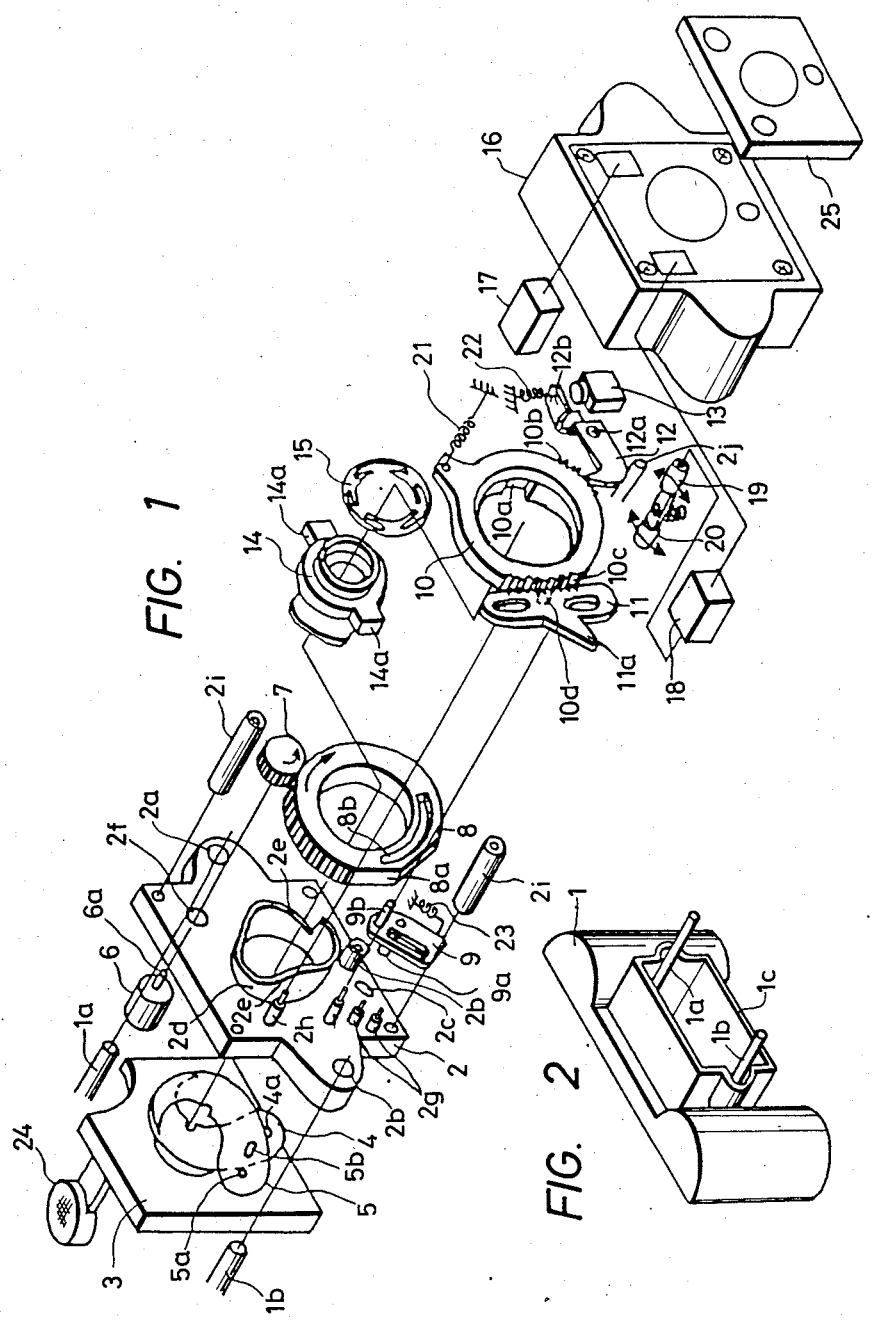

VARIABLE FOCAL LENGTH, AUTOMATIC FOCUSING CAMERA WITH A SINGLE MOTOR

BACKGROUND

1. Technical Field

This invention relates to a drive train for an automatic focusing mechanism in a variable focal length camera in which a main lens system is moved forwardly and an auxiliary lens system provided behind the main lens system is allowed to go in and out of the photographic optical axis, in order to change the focal length. Focusing is achieved by moving the main lens only.

2. Description of the Prior Art

Japanese Patent Application Laid-Open No. 46610/1984, and others have disclosed a variable focus type camera which changes its focal length. It employs a mechanism in which a main lens driving system in the automatic focusing mechanism and the shutter are powered by a motor provided in a lens barrel unit which is movable back and forth. However, no consideration has been given to an integrated drive mechanism for the mechanical scanning involved in the distance measuring mechanism in the automatic focusing apparatus.

In the case of such a conventional variable focal length automatic focusing camera, the distance measuring mechanism is incorporated into the camera body. However, it is considerably difficult to electrically transmit to output signal of the distance measuring device to the lens barrel unit which is moving. Accordingly, in the case of a very popular manufactured unit, the distance measuring mechanism has a mechanical scanning mechanism, and its signal is mechanically transmitted to the main lens driving system. However, this mechanism is necessarily intricate, thus occupying a large part of the space in the camera. Obviously, this is unsuitable for making a compact camera.

SUMMARY OF THE INVENTION

Accordingly, an object of this invention is to provide a simplified drive mechanism for a lens barrel unit in a variable focal length, automatic focusing camera. In the invention, a motor is arranged in the lens barrel unit so that automatic focusing involving both a mechanical scanning operation and a lens driving operation as well as a shutter driving operation are achieved with the aid of one motor. These operations must be achieved irrespective of the positions to which an automatic focusing mechanism and a main lens driving system have been moved in correspondence to the switched focal length.

BRIEF DESCRIPTION OF THE DRAWINGS

FIG. 1 is an exploded perspective view showing essential components of one embodiment of this invention.

FIG. 2 is a perspective view of the camera body upon which the embodiment of FIG. 1 is mounted.

DETAILED DESCRIPTION OF THE PREFERRED EMBODIMENT

One embodiment of this invention will be described with reference to the accompanying drawings.

FIG. 1 is an exploded perspective view of a lens barrel unit. First, FIG. 1 will be described in brief. Slide guide pins 1a and 1b are embedded in a camera body 1, as illustrated in FIG. 2. The lens barrel unit is movably supported on the guide pins 1a and 1b and is moved back and forth relative to the camera body. An auxiliary lens system 24 is caused to go in and out of the optical path by a mechanism (not shown), so that the focal length of the barrel unit lens is changed.

Now, the lens barrel unit will be described in detail. A lens barrel base plate 2 has guide holes 2a and 2b, into which the guide pins 1a and 1b are inserted respectively, so that the lens barrel base plate 2 is held perpendicular to the optical axis at all times. Shutter blades 4 and 5 are provided behind the base plate 2. More specifically, the shutter blades 4 and 5 are supported on a stationary plate 3 in such a manner that the shutter blades 4 and 5 are rotatable about points 4a and 5a, respectively.

The stationary plate 3 is secured to the base plate 2 with a space therebetween which is large enough for the shutter blades 4 and 5 to rotate. When the stationary plate 3 is combined with the base plate 2, a protrusion 9a on a shutter drive lever 9 passes through a hole 2c in the base plate 2 and engages with a drive hole 5b formed in the shutter blade 5. A pulse motor 6 is secured to the rear surface of the base plate 2. The output shaft 6a of the motor 6 passes through a hole 2f formed in the base plate 2 to turn a drive gear 7 which is engaged with a cam ring 8. The cam ring 8 is rotatably supported around a tubular protrusion 2d formed on the base plate 2 around the optical axis. A circumferential surface 8a of the cam ring 8 is abutted against the protrusion 9b of the shutter driver lever 9 as the cam ring turns. As the cam ring 8 turns, the shutter drive lever 9 is slid while being guided by two protrusions 2g on the base plate 2 and biased by a spring 23.

A main lens 14 is rotatably supported inside the tubular protrusion 2d. The main lens 14 is held through an intermediate retaining ring 15 by a distance ring 10 in such a manner that two protrusions 14a of the main lens 14 abut against a cam surface 2e which is formed in the front surface of the tubular protrusion 2d. When the main lens 14 is held as described above, lugs 14a on the side of the main lens 14 are engaged with axial slots 10a (only one is shown) formed in the inner wall of the distance ring 10. Therefore, as the distance ring 10 turns, the main lens 14 is moved back and forth.

The distance ring 10 is biased in a clockwise direction by a spring 21. Before the shutter is released, a stopper 10d is abutted against one end of a cam ring groove 8b on the cam ring 8 so that the distance ring 10 is held at rest. Latch teeth 10b and automatic focusing scan drive teeth 10c are formed in the outer circumferential surface of the distance ring 10. A stop pawl 12 is supported on the base plate 2 in such a manner that it is rotatable about an axis 12a. The stop pawl 12 is biased counterclockwise by a spring 22 which is engaged with a bend 12b of the pawl 12 so that the stop pawl 12 is held abutted against a stopper 2j extending from the base plate 2. An electro-magnet 13 is secured to the base plate 2 to cause the stop pawl 12 to engage with the latch teeth 10b against the elastic force of the spring 22.

An automatic focusing scan lever 11 is slidably supported by two pins 2h embedded in the base plate 2 so as to engage with the automatic focusing scan drive teeth 10c. The automatic focusing scan lever 11 has a protrusion 11a abutted against an emitting diode lever 20. An automatic focusing light receiving section 17 and an automatic focusing light emitting section 18 are secured to the rear surface of a lens barrel cover 16 which are secured to the base plate 2 with four posts 2i (only two of which are shown). The automatic focusing light receiving section 17 contains a photo-diode. In the automatic focusing light emitting section 20, an infrared emitting diode 19 is supported through a shaft (not shown) by the emitting diode lever 20, and its end is abutted against the automatic focusing scan lever protrusion 11a. A photometric light receiving element 26 is mounted on the front surface of the base plate 2.

The operation of the apparatus will now be described. In association with the releasing operation, the output shaft of the pulse motor 6 is turned counterclockwise, and therefore the cam ring 8 is turned clockwise through the drive gear 7. In this operation, the distance ring 10 having the stopper 10d engaged with the groove 8b is turned clockwise by the tensile force of the spring 21. At the same time, the main lens 14 is caused to move along the optical axis and the infrared emitting diode 19 is scanned by means of the automatic focusing scan lever 11 and the emitting diode lever 20. A focusing signal from the automatic focusing light receiving section 17 which has received infrared rays from the infrared emitting diode 19 drives the electromagnet 13 so that the latter 13 attracts the bend 12b of the stop pawl 12. As a result, the latch teeth 10b are engaged with the stop pawl 12. Thus, the rotation of the distance ring 10 has been accomplished.

Irrespective of the stopping of the distance ring 10, the pulse motor 6 turns the cam lever to the position where the latter does not touch the shutter driver lever 9 and would not rotate the distance ring 10 to more than the last tooth of the latch teeth 10b, and then the motor stops. This is a focus lock state. When the release button is further depressed, the pulse motor 6 rotates again. Therefore, with the aid of the cam surface 8a of the cam ring 8, the shutter drive lever 9 slides against the tensile force of the spring 23, thus opening the shutter blades 4 and 5.

When automatic exposure data applied to the photometric light receiving element 26 indicates that the shutter exposure is suitable, the pulse motor rotates in the opposite direction, and the shutter blades are closed by the shutter drive spring 23. The pulse motor 6 is continuously rotated in this opposite direction, so that, when the end of groove 8b of the cam ring 8 abuts against the distance ring stopper 10d, the distance ring 10 is turned (energized) to return the main lens 14 to its original position. In this operation, the magnet 13 is deenergized simultaneously when the motor is rotated in the opposite direction. As a result, the distance ring 10 is turned in the opposite direction while the stopper pawl 12 is returned to the position where it abuts against the stopper 2j under the tension of the spring 22, and the stopper pawl 12 is held at rest in this position. Thus, all the components have been placed in the states which are provided before the release operation is effected. Of course, if the pulse motor 6 is rotated in the opposite direction by restoring the release button in the focus lock state, then prefocusing can be performed as many times as desired. This can be carried out no matter where the lens barrel unit is located. Therefore, the technical concept of the invention can be applied to zoom lens cameras.

In the above-described embodiment, both the light emitting element and the light receiving element are provided in the lens barrel. However, even if the light emitting element is provided in the lens barrel and the light receiving element is arranged outside the lens barrel, an automatic focusing function can be obtained, and the degree of freedom in space or design is increased.

Furthermore, in the above-described embodiment, a pulse motor is employed. However, it goes without saying that the pulse motor may be replaced by the ordinary motor which operates in a so-called "analog mode".

As is apparent from the above description, according to the invention, in the variable focus type camera having the automatic focusing mechanism in which the focal length is changed by moving the lens barrel unit, and focusing is achieved by moving the main lens, the automatic scanning section is arranged in the lens barrel unit. The automatic focusing scanning operation, the lens driving operation and the shutter driving operation are carried out with the aid of the pulse motor in the lens barrel unit. Therefore, no troublesome cooperation with the body is required. Furthermore, since only one pulse motor is used for the above-described operations, no intricate mechanisms are required. Thus, the variable focus type automatic focusing camera of the invention is economical in the use of space, low in manufacturing cost, and simple in construction.

I claim:

1. An automatic focusing barrel lens unit for attachment to a camera body for movement towards and away from said body, comprising:

means of aligning an optical axis of said barrel unit with a photographic axis of said camera;

a main lens system disposed in said barrel unit along said optical axis;

first means, disposed within said barrel unit, for moving at least a part of said main lens system along said optical axis for focusing said main lens system;

an automatic focusing mechanism, disposed within said barrel unit, for controlling said first means and including a mechanical scanning mechanism;

a shutter mechanism, disposed within said barrel unit, for controlling the passage of light along said optical axis;

a motor disposed within said barrel unit;

second means, disposed entirely within said barrel unit operatively engaging said first means, said mechanical scanning mechanism, and said shutter mechanism and mechanically driven solely by said motor for providing sole mechanical power from said motor to said first means, said mechanical scanning mechanism and said shutter mechanism.

2. A barrel lens unit as recited in claim 1, wherein said second means includes a cam ring disposed around said optical axis and having a cam surface and said barrel unit further including a cam lever coupled to said shutter mechanism and in juxtaposition to said cam surface and engageable by said cam surface during rotation of said cam ring for operating said shutter mechanism.

3. A barrel unit as recited in claim 2, wherein said cam ring has a circumferential slot with two ends and said barrel unit further comprising:

a lens barrel base plate for movement parallel to said optical axis, an axial hole within the base plate defined by a axial tubular protrusion, said cam ring being rotatably mounted on said tubular protrusion for rotation about said optical axis, said main lens being rotatably supported inside said tubular protrusion, said tubular protrusion defining an axial cam surface, said main lens abutting said tubular protrusion axial cam a distance ring coaxial with said cam ring and mounted in front of said cam ring to the side thereof remote from said lens barrel base plate, a pair of diametrically opposite axial slots formed within said distance ring, said main lens including a pair of diametrically opposite radially outwardly projecting lugs sized to and slidably fitted within respective axial slots of said distance ring, a stopper fixed to said distance ring and projecting parallel to the optical axis and insertably received within said circumferential slot within said cam ring such that the cam ring rotatably drives said distance ring when said stopper abuts an end of said circumferential slot, and means for tightly coupling said scanning mechanism to said cylindrical member.

4. A barrel lens unit as recited in claim 3, further comprising:
  stopping means for mechanically stopping the rotation of said distance ring;
  spring means for biasing said stopping means to stop said rotation of said distance ring; and
  selectively operable means for opposing the biasing of said stopping means by said spring means.

5. A barrel lens unit as recited in claim 4, further including aligned light emitting and light receiving elements disposed within said barrel unit and means responsive to light transmission between said light emitting and receiving elements for controlling the operation of said opposing means.

* * * * *